United States Patent
Tessler et al.

(10) Patent No.: US 12,417,505 B2
(45) Date of Patent: Sep. 16, 2025

(54) DETECTING RELIABILITY ACROSS THE INTERNET AFTER SCRAPING

(71) Applicant: Capital One Services, LLC, McLean, VA (US)

(72) Inventors: Leeyat Bracha Tessler, Arlington, VA (US); Robert Mays, Midlothian, VA (US); Tyler Maiman, Melville, NY (US); Juwan Byrd, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 319 days.

(21) Appl. No.: 17/932,114

(22) Filed: Sep. 14, 2022

(65) Prior Publication Data

US 2024/0087064 A1 Mar. 14, 2024

(51) Int. Cl.
*G06Q 30/00* (2023.01)
*G06F 16/951* (2019.01)
*G06Q 50/18* (2012.01)

(52) U.S. Cl.
CPC ......... *G06Q 50/184* (2013.01); *G06F 16/951* (2019.01)

(58) Field of Classification Search
None
See application file for complete search history.

(56) References Cited

U.S. PATENT DOCUMENTS

| | | | |
|---|---|---|---|
| 8,943,588 B1 * | 1/2015 | Speegle | H04L 63/1416 726/22 |
| 2005/0131718 A1 * | 6/2005 | Campagna | G06T 1/005 705/401 |
| 2008/0021981 A1 * | 1/2008 | Kumar | G06F 16/951 709/219 |
| 2018/0013789 A1 * | 1/2018 | Damian | H04L 63/1483 |
| 2018/0018349 A1 * | 1/2018 | Liu | G06F 16/9532 |
| 2018/0239826 A1 * | 8/2018 | Epstein | G06Q 50/184 |
| 2018/0268817 A1 * | 9/2018 | Aono | G10L 15/22 |
| 2019/0019055 A1 * | 1/2019 | Zhou | G06T 7/10 |
| 2020/0089692 A1 * | 3/2020 | Tripathi | G06F 16/288 |
| 2021/0049234 A1 * | 2/2021 | Kumar | G06F 40/117 |

(Continued)

OTHER PUBLICATIONS

Identifying and extracting relations in text, Author: Byrd, R. J.; Ravin, Y., Publication info: Applications of Natural Language to Information Systems. Proceedings 4th International Conference, NLDB'99 : 149-53275. Osterreichische Comput. Gesellschaft. (1999). (Year: 1999).*

(Continued)

*Primary Examiner* — Matthew T Sittner
(74) *Attorney, Agent, or Firm* — Harrity & Harrity, LLP

(57) ABSTRACT

In some implementations, a reliability modeler may receive a plurality of webpages associated with a first entity from an Internet scraping device. The reliability modeler may detect, within the plurality of webpages, at least one of a logo, a font, or a color. The reliability modeler may apply a model, trained on a set of guidelines associated with the first entity, to the logo, the font, or the color. Accordingly, the reliability modeler may determine, based on output from the model, that the plurality of webpages are unlikely to be authorized by the first entity. The reliability modeler may transmit, to a user device, an alert based on determining that the plurality of webpages are unlikely to be associated with the first entity.

20 Claims, 11 Drawing Sheets

(56) References Cited

U.S. PATENT DOCUMENTS

| | | | | |
|---|---|---|---|---|
| 2021/0150245 A1* | 5/2021 | Liu | ............... | G06F 18/22 |
| 2021/0174118 A1* | 6/2021 | Chhabra | ............... | G06V 20/635 |
| 2022/0139375 A1* | 5/2022 | Kwatra | ............... | G10L 25/30 |
| | | | | 704/243 |
| 2022/0174092 A1* | 6/2022 | Farjon | ............... | H04L 63/123 |
| 2024/0037811 A1* | 2/2024 | Azaz | ............... | G06F 40/103 |

OTHER PUBLICATIONS

Probabilistic Models for Information Extraction: From Cascaded Approach to Joint Approach, Author: Yu, Xiaofeng, Publication info: The Chinese University of Hong Kong (Hong Kong). ProQuest Dissertations & Theses, 2010. (Year: 2010).*

Mohammad et al., "Tutorial and Critical Analysis of Phishing Websites Methods," Computer Science Review, available at http://eprints.hud.ac.uk/id/eprint/24236, 2015, 57 pages.

Opara et al., "HTMLPhish: Enabling Phishing Web Page Detection by Applying Deep Learning Techniques on HTML Analysis," arXiv.org, May 15, 2020, 9 pages.

* cited by examiner

DETECTING RELIABILITY ACROSS THE INTERNET AFTER SCRAPING

BACKGROUND

Reliable websites are sometimes difficult to distinguish from websites that copy branding (e.g., names, logos, or slogans). For example, an infringing entity may copy and use branding without authorization to do so from an entity that owns (or at least controls) the branding.

SUMMARY

Some implementations described herein relate to a system for detecting reliability after web scraping. The system may include one or more memories and one or more processors communicatively coupled to the one or more memories. The one or more processors may be configured to receive a plurality of webpages associated with a first entity from an Internet scraping device. The one or more processors may be configured to detect, within the plurality of webpages, at least one of a logo, a font, or a color. The one or more processors may be configured to apply a model, trained on a set of guidelines associated with the first entity, to the logo, the font, or the color. The one or more processors may be configured to determine, based on output from the model, that the plurality of webpages are unlikely to be authorized by the first entity. The one or more processors may be configured to transmit, to a user device, an indication of the plurality of webpages. The one or more processors may be configured to update the model based on feedback from the user device.

Some implementations described herein relate to a method of detecting reliability after web scraping. The method may include receiving a plurality of webpages associated with a first entity from an Internet scraping device. The method may include detecting, within the plurality of webpages, at least one of a logo, a font, or a color. The method may include applying a model, trained on a set of guidelines associated with the first entity, to the logo, the font, or the color. The method may include determining, based on output from the model, that the plurality of webpages are unlikely to be authorized by the first entity. The method may include transmitting, to a user device, an alert based on determining that the plurality of webpages are unlikely to be associated with the first entity.

Some implementations described herein relate to a non-transitory computer-readable medium that stores a set of instructions for detecting reliability after web scraping for a device. The set of instructions, when executed by one or more processors of the device, may cause the device to receive a plurality of webpages associated with a first entity from an Internet scraping device. The set of instructions, when executed by one or more processors of the device, may cause the device to detect, within the plurality of webpages, a logo associated with a first color. The set of instructions, when executed by one or more processors of the device, may cause the device to detect, within the plurality of webpages, a font associated with a second color. The set of instructions, when executed by one or more processors of the device, may cause the device to apply a model, trained on a set of guidelines associated with the first entity, to the logo, the font, the first color, and the second color. The set of instructions, when executed by one or more processors of the device, may cause the device to determine, based on output from the model, that the plurality of webpages are unlikely to be authorized by the first entity. The set of instructions, when executed by one or more processors of the device, may cause the device to transmit, to a user device, an indication of the plurality of webpages. The set of instructions, when executed by one or more processors of the device, may cause the device to update the model based on feedback from the user device.

DETAILED DESCRIPTION

The following detailed description of example implementations refers to the accompanying drawings. The same reference numbers in different drawings may identify the same or similar elements.

An infringing entity may copy and use branding on a website without authorization to do so from an entity that owns (or at least controls) the branding. Finding and detecting unauthorized websites costs power and processing resources (e.g., scouring the Internet and analyzing websites that are found). One way to try to detect infringing products and stores is to train a machine learning model on a training set of labeled examples that includes infringing examples as well as reliable examples. Accordingly, the model may attempt to identify features of websites that are associated with infringement or general unreliability. However, training the machine learning model is computationally intense, and the machine learning model may inadvertently identify irrelevant features as indicative of infringement. Irrelevant features waste power and processing resources each time the machine learning model is executed.

Some implementations described herein provide a model trained on a set of guidelines to detect reliability. Training the model on the guidelines conserves power and processing resources as compared with training the model on a large training set of labeled examples of reliability and labeled examples of unreliability. Additionally, training the model on the guidelines reduces chances that the machine learning model will inadvertently identify irrelevant features as indicative of unreliability. Accordingly, power and processing resources will be conserved each time the machine learning model is executed. Additionally, or alternatively, the model may be trained on coding styles. Training the model on the coding styles conserves power and processing resources as compared with training the model on a large training set of labeled code examples. Additionally, training the model on the coding styles reduces chances that the machine learning model will inadvertently identify irrelevant features as indicative of unreliability.

In some implementations, the model may be applied by to websites found via Internet scraping. Accordingly, combining the model with Internet scraping allows for finding and identifying unauthorized websites faster and with fewer processing resources than other techniques. In some implementations, the model may additionally or alternatively detect unauthorized websites based on code. For example, the code may include hypertext markup language (HTML) code, cascading style sheets (CSS), JavaScript® code, and/or another type of code.

Figure 1A:
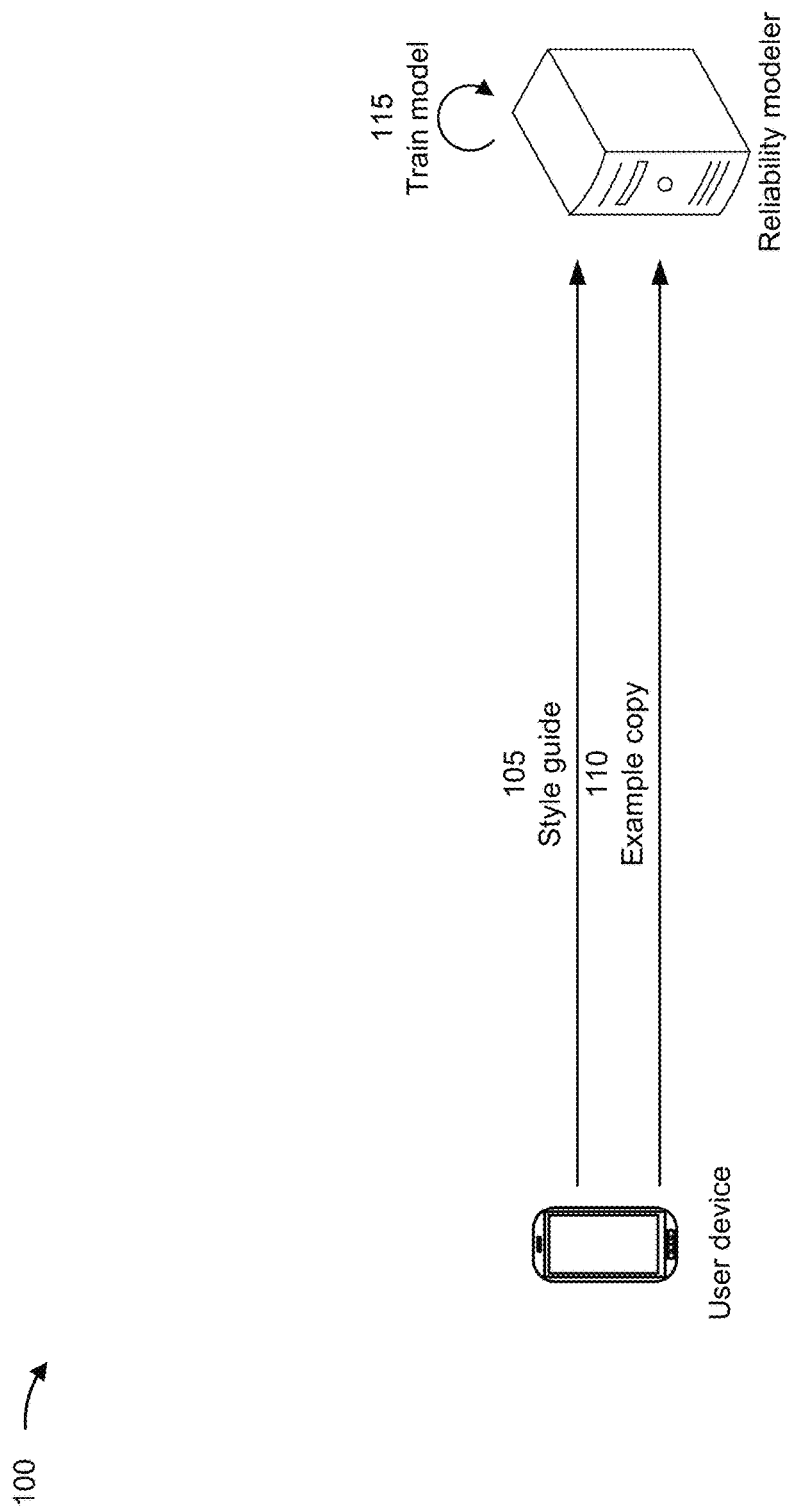
FIGS. 1A-1C are diagrams of an example implementation relating to detecting reliability across the Internet after scraping, in accordance with some embodiments of the present disclosure.
Figure 1B:
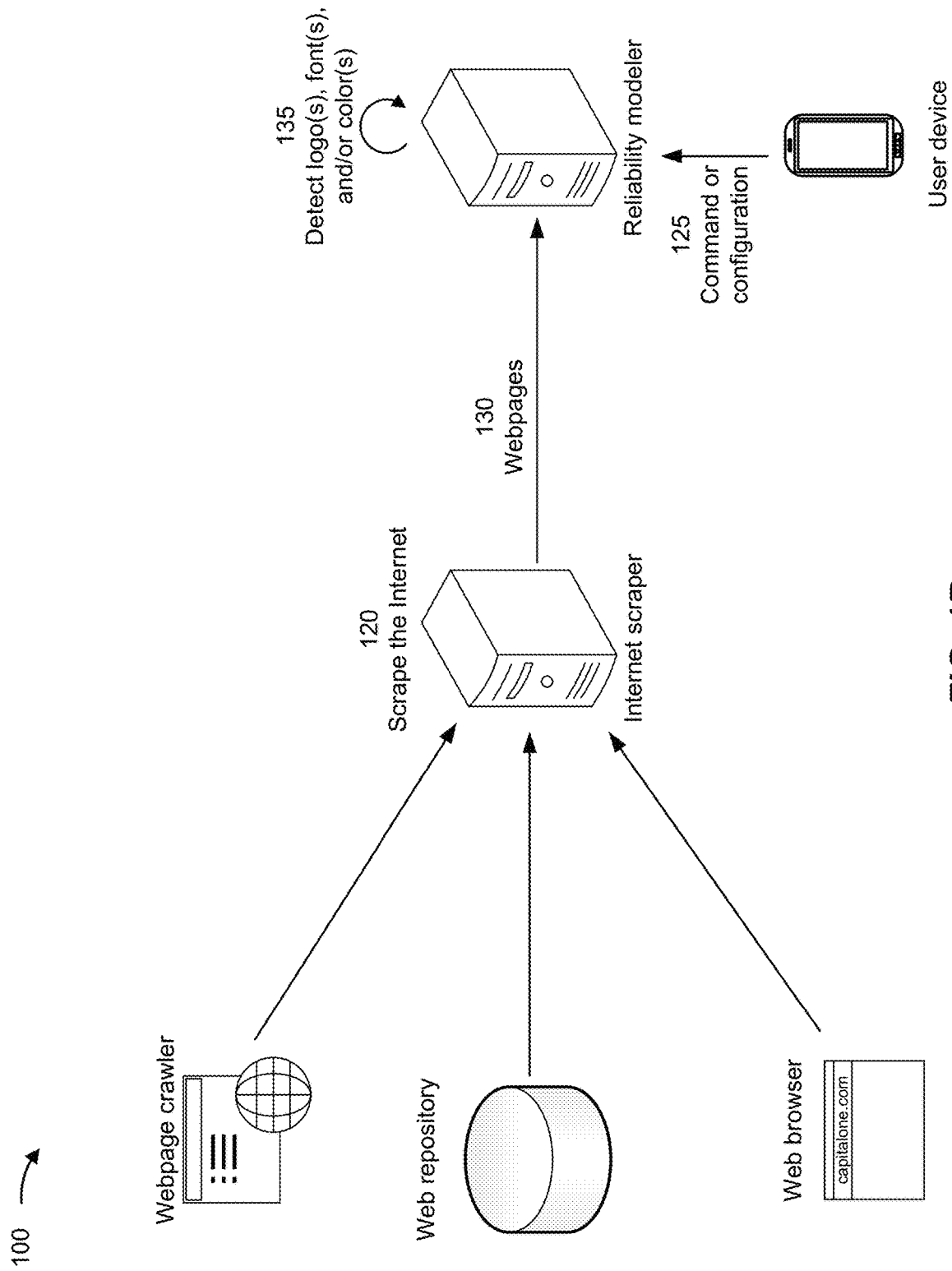
Figure 1C:
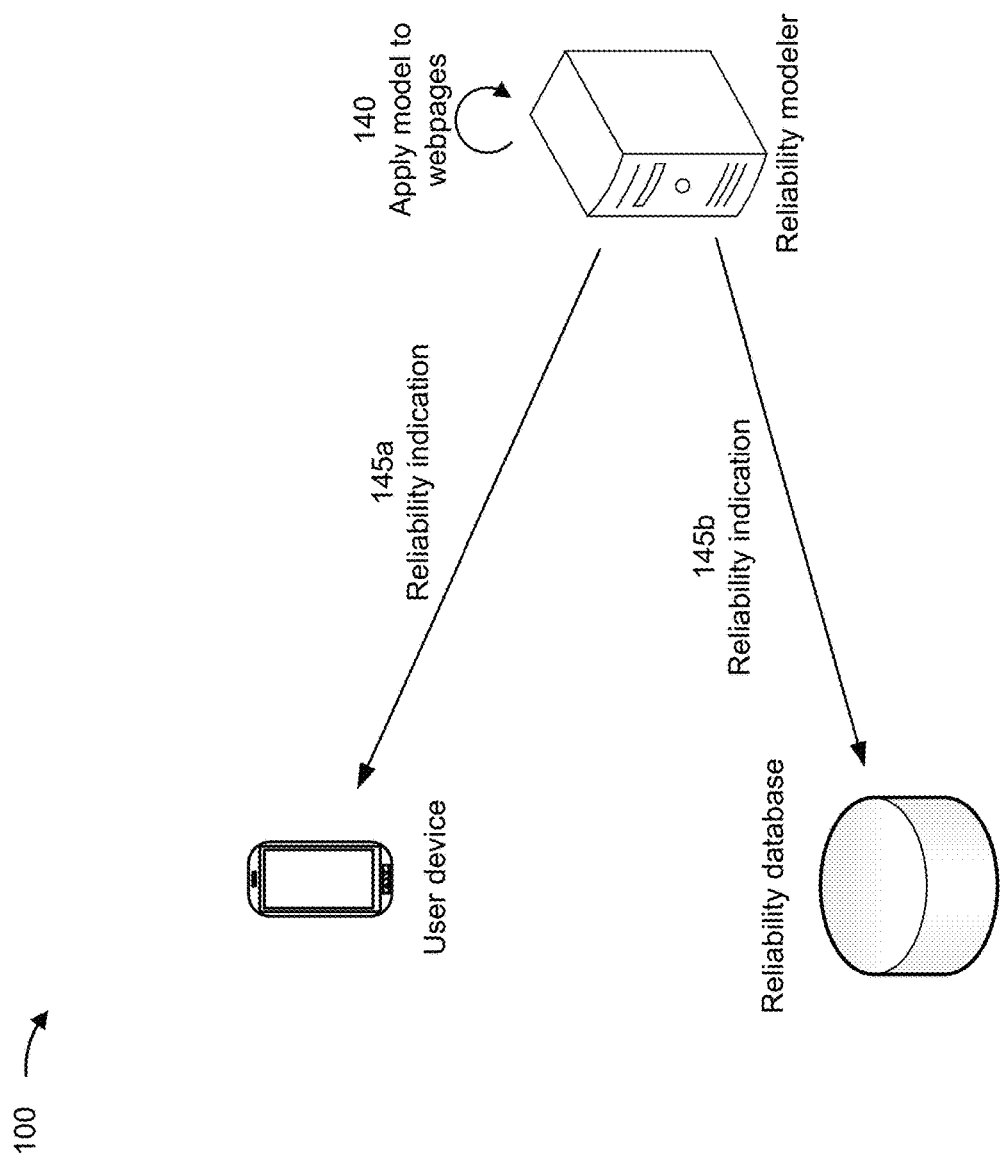

FIGS. 1A-1C are diagrams of an example 100 associated with detecting reliability across the Internet after scraping. As shown in FIGS. 1A-1C, example 100 includes a user device, a reliability modeler, an Internet scraper, and a reliability database. These devices are described in more detail in connection with FIGS. 4 and 5.

As shown in FIG. 1A and by reference number 105, the user device may transmit, and the reliability modeler may receive, a style guide associated with a first entity. For example, the style guide may include a portable document format (pdf) file, a Microsoft Word® document, an internet webpage (e.g., one or more intranet pages), and/or another type of data structure encoding a set of guidelines associated with the first entity. The set of guidelines may specify colors (e.g., red green blue (RGB) values and/or hexadecimal codes) to use, fonts to use, logos to use (e.g., by including copies of the logos and/or hyperlinks to files encoding the logos), logo sizes and spacings (e.g., as described in connection with FIGS. 2A and 2B) to use, and/or text sizes and spacings (e.g., as described in connection with FIGS. 2B and 2C) to use, among other examples.

Additionally, or alternatively, as shown by reference number 110, the user device may transmit, and the reliability modeler may receive, example copy authorized by the first entity. For example, the example copy may include pdf files, Microsoft Word documents, internet webpages, emails, and/or other types of digital documents authored and approved by the first entity. Accordingly, the reliability modeler may determine, from the example copy, colors, fonts, logos (e.g., by extracting copies of the logos from the example copy), logo sizes and spacings (e.g., as measured in the example copy), and/or text sizes and spacings (e.g., as measured in the example copy), among other examples.

The user device may transmit the style guide and/or the example copy during a registration procedure with the reliability modeler. Accordingly, the user device may include the style guide and/or the example copy in a registration message. Alternatively, the user device may transmit style guide and/or the example copy after transmitting the registration message. In another example, a user of the user device may be an administrator for the reliability modeler, and the user may instruct the user device to transmit the style guide and/or the example copy in order to setup or otherwise configure the reliability modeler to begin looking for unreliable websites, as described herein.

As shown by reference number 115, the reliability modeler may train a model on the style guide and/or the example copy. For example, the reliability modeler may train the model as described in connection with FIG. 3A. The model may recognize indicia of reliability (e.g., colors, fonts, logos, logo sizes and spacings, and/or text sizes and spacings, among other examples) and thus determine when a webpage is likely (or unlikely) to be authorized by the first entity. Training the model on the style guide conserves power and processing resources as compared with training the model on a large training set of labeled examples. Additionally, training the model on the style guide reduces chances that the model will inadvertently identify irrelevant features as indicative of unreliability. Accordingly, power and processing resources will be conserved each time the model is executed.

Additionally, or alternatively, the reliability modeler may extract code (e.g., HTML, code, CSSs, JavaScript code, and/or another type of code) from the example copy. For example, the example copy may include webpages (whether on an intranet and/or on the Internet) authored and approved by the first entity. Accordingly, the reliability modeler may determine, from the example copy, programming style. Programming style may include an indentation style (e.g., how HTML start and end tags are indented, how CSS start and end tags are indented, or how JavaScript brackets are indented, among other examples), an alignment style (e.g., whether operators such as =are aligned along columns, among other examples), spaces (e.g., whether white spaces are added before and/or after operators or whether white spaces are added before or after function parameters, among other examples), and/or tabs (e.g., whether tabs are used within structures such as classes and functions or a size of tab stops used in the code, among other examples). Accordingly, the model may recognize programming indicia that are similar to that used by the first entity (e.g., indentation style, alignment style, spaces, and/or tabs, among other examples) and thus determine when a webpage is likely (or unlikely) to be authored by the first entity. Training the model on the coding styles conserves power and processing resources as compared with training the model on a large training set of labeled examples. Additionally, training the model on the coding styles reduces chances that the model will inadvertently identify irrelevant features as indicative of unreliability. Accordingly, power and processing resources will be conserved each time the model is executed.

As shown in FIG. 1B and by reference number 120, the Internet scraper (also referred to as an "Internet scraping device" herein) may scrape the Internet. As used herein, an "Internet scraper" refers to hardware (or a combination of hardware and software) that is configured to extract information from websites available on the Internet. For example, an Internet scraper may include a bot and/or a web crawler configured to fetch and extract webpages over the Internet.

In some implementations, the Internet scraper may include a crawler configured to try to find new webpages on the Internet (e.g., similarly to a search engine). In some implementations, the Internet scraper may maintain a web repository (which may be local to, or at least partially separate from, the Internet scraper). The web repository may score previously scraped webpages. Accordingly, the crawler may only try to find new webpages and updates to webpages already stored in the web repository. As a result, power, processing resources, and network resources consumed by the crawler may be reduced.

In some implementations, the Internet scraper may additionally use a web browser to mimic human interaction with a website. For example, the Internet scraper may execute a virtual web browser and transform the Internet scraper's commands into commands that mimic human interaction, such as mouse movements and clicks or touchscreen scrolls and taps. Accordingly, the Internet scraper may obtain webpages that are otherwise not accessible by the crawler.

The Internet scraper may run relatively continuously. For example, the Internet crawler may begin a new search for new webpages (and updates to webpages already stored in the web repository) after completion of a previous search. Alternatively, the Internet scraper may run according to an interval. For example, the Internet scraper may run a search for new webpages (and updates to webpages already stored in the web repository) once per day or once per week, among other examples. The interval may be configured by the user device. For example, the user device may transmit, and the Internet scraper may receive, an indication of the interval to apply.

In some implementations, as shown by reference number 125, the user device may transmit, and the reliability modeler may receive, a command or a configuration associated with assessing webpages from the Internet scraper. For example, the user device may transmit the command to trigger an on-demand assessment of scraped webpages by the reliability modeler. On the other hand, the user device may transmit the configuration to schedule periodic assessment of scraped webpages by the reliability modeler. For example, the user device may indicate that the reliability modeler should apply the model to the scraped webpages once per day or once per week, among other examples. The reliability modeler may only apply the model to newly scraped webpages (or webpages where updates were scraped since the reliability modeler last applied the model) in order to conserve power and processing resources.

As shown by reference number 130, the Internet scraper may transmit, and the reliability modeler may receive, a plurality of webpages associated with the first entity from the Internet scraping device. For example, the reliability modeler may transmit a request for the webpages based on receiving the command from the user device or based on the configuration from the user device (e.g., according to a schedule indicated by the configuration). Accordingly, the Internet scraper may transmit the webpages in response to the request. Alternatively, the reliability modeler may subscribe to receive webpages from the Internet scraper. Accordingly, the Internet scraper may transmit new webpages (and updates to webpages already stored in the web repository), as soon as available, to the reliability modeler. Alternatively, the Internet scraper may transmit new webpages (and updates to webpages already stored in the web repository), according to a subscription schedule, to the reliability modeler.

Figure 3A:
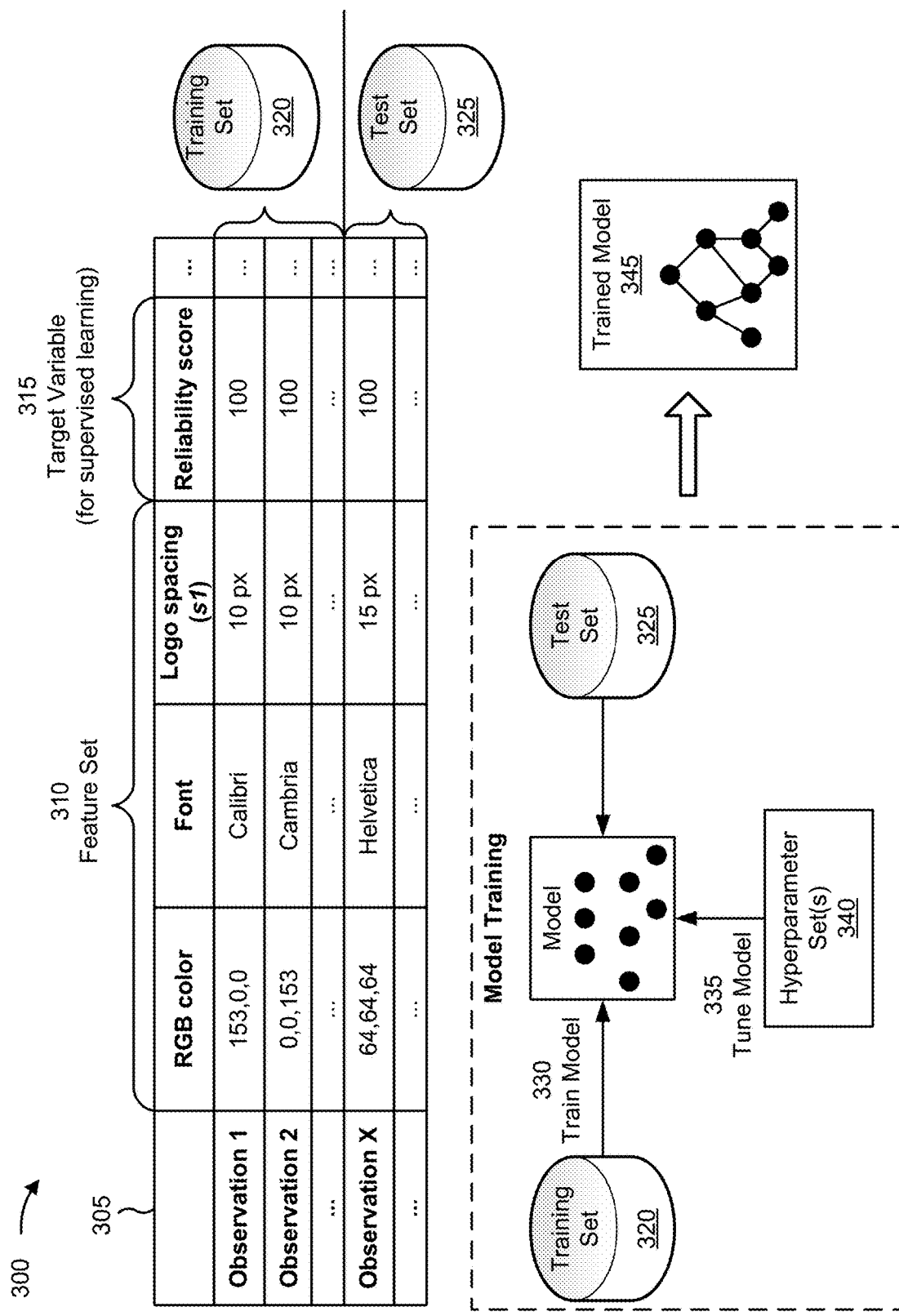
FIGS. 3A-3B are diagrams illustrating an example of training and using a machine learning model in connection with detecting reliability across the Internet after scraping, in accordance with some embodiments of the present disclosure.
Figure 3B:
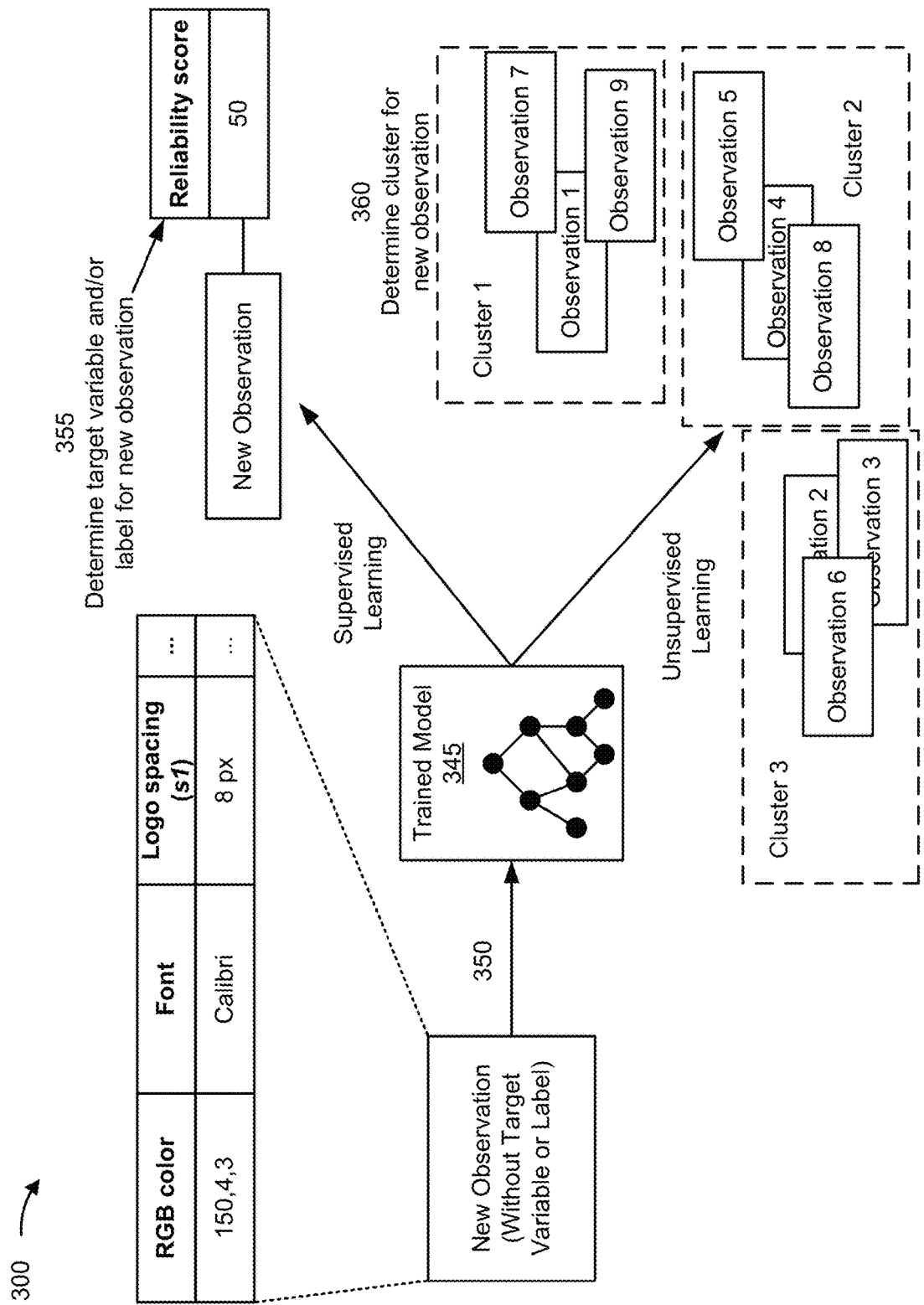

In some implementations, the reliability modeler may discard any webpages that do not appear to be associated with the first entity. For example, the reliability modeler may scan the webpages for a name (e.g., Capital One or Capital One Bank), a logo (e.g., as shown in FIGS. 3A and 3B), a slogan (e.g., "What's In Your Wallet"), and/or another type of indicator that the webpages allege to be authorized by the first entity. Alternatively, the Internet scraper may only transmit, to the reliability modeler, webpages that appear to be associated with the first entity. Accordingly, the Internet scraper may conserve power, processing resources, and network resources by transmitting smaller payloads to the reliability modeler.

In some implementations, the webpages may each be associated with a same domain name. Accordingly, the plurality of webpages may form a single website. Alternatively, the webpages may be associated with multiple domain names (and thus from multiple websites).

As shown by reference number 135, the reliability modeler may detect, within the plurality of webpages, a logo, a font, and/or or a color. For the logo, the reliability modeler may render the webpages and then apply a Viola-Jones object detection framework based on Haar features, a scale-invariant feature transform (SIFT) model, a Single Shot MultiBox Detector (SSD), or a You Only Look Once (YOLO) model, among other examples, to the rendered webpages to detect the logo. The reliability modeler may also determine bounding boxes (e.g., at least one bounding box corresponding to at least one of the webpages) associated with the logo. Accordingly, the reliability modeler may extract the logo by cropping the rendered webpages according to the bounding boxes. Alternatively, the reliability modeler may extract the logo from code associated with the webpages (e.g., HTML code and/or CSS, among other examples).

For the font, the reliability modeler may detect, within the webpages, at least one font. For example, the reliability modeler may estimate the font based on detecting shapes of one or more letters printed on the webpage. Alternatively, the reliability modeler may determine the font from code associated with the webpages (e.g., HTML, code and/or CSS, among other examples).

For the color, the reliability modeler may determine an RGB color value and/or a hexadecimal code associated with the color. In some implementations, the reliability modeler may determine the color based on code associated with the webpages (e.g., HTML code and/or CSS, among other examples). In some implementations, the reliability modeler may analyze the webpages for colors other than whites and blacks. Additionally, or alternatively, the reliability modeler may analyze a portion of webpages for colors associated with the logo. For example, the reliability modeler may crop the webpages according to bounding boxes described above (e.g., at least one bounding box corresponding to at least one of the webpages).

In some implementations, the reliability modeler may additionally detect a placement and a size associated with the logo. For example, the reliability modeler may estimate based on rendering the webpages (or determine from code associated with the webpages) the placement of the logo relative to features of the webpages (e.g., if the logo is in a header of the webpages, if the logo is centered on the webpages, or an estimated distance between the logo and nearby text, among other examples). With respect to the size of the logo, the reliability modeler may estimate a real size (e.g., based on rendering the webpages on a monitor or a virtual display) and/or a pixel size (e.g., based on the code associated with the webpages). Additionally, or alternatively, the reliability modeler may detect a spacing (e.g., at least one spacing) associated with the logo. For example, the reliability modeler may estimate (e.g., in real distance and/or in pixel distance) an amount of white space between the logo and a nearby feature (e.g., a color or a color gradient; text, as represented by s1 in FIG. 2A; an image; a menu, as represented by s2 in FIG. 2A; a border, as represented by s1 in FIG. 2B, among other examples).

In some implementations, the reliability modeler may additionally detect a white space measurement (e.g., one or more white space measurements) associated with a plurality of words. For example, the webpages may include text that the reliability modeler detects (e.g., using optical character recognition (OCR)), and the reliability modeler may estimate white space between the detected text and other features (e.g., the logo, as represented by s1 in FIG. 2A, a border, a menu, or an image, among other examples).

Figure 2A:
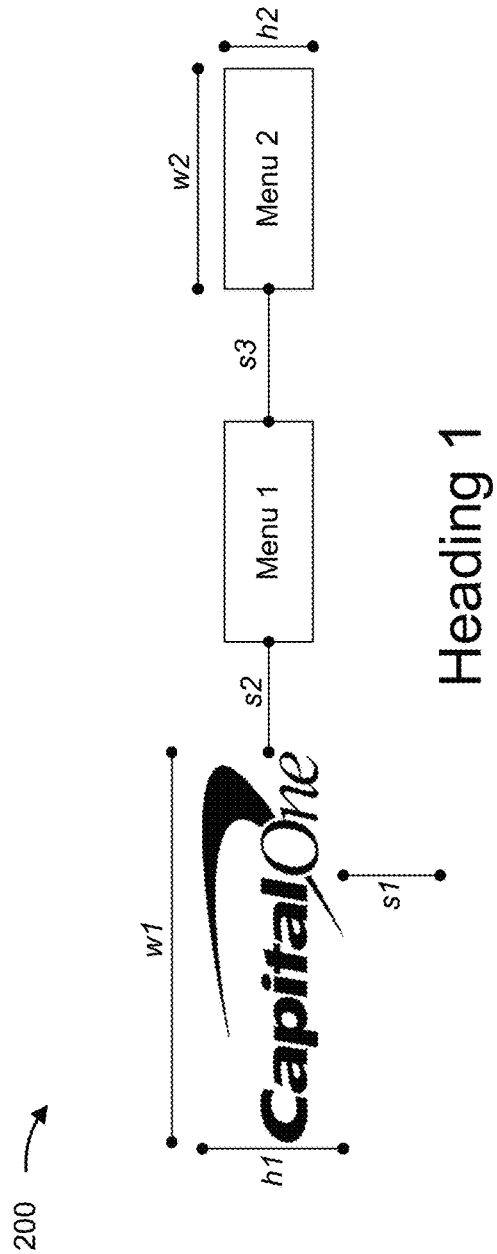
FIGS. 2A-2C are diagrams of example implementations relating to detecting reliability across the Internet after scraping, in accordance with some embodiments of the present disclosure.
Figure 2B:
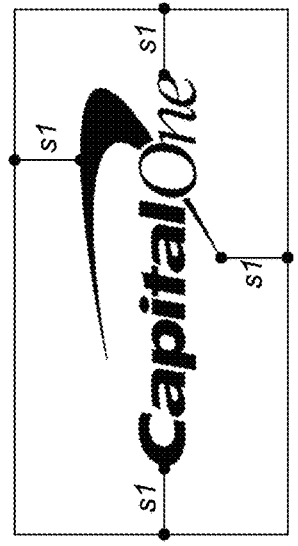
Figure 2B:
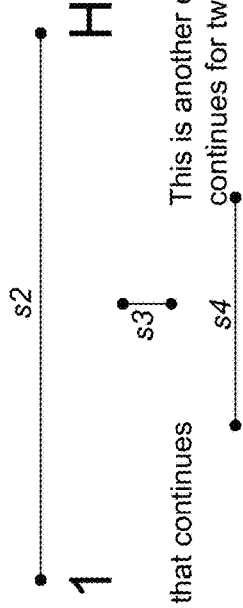
Figure 2C:
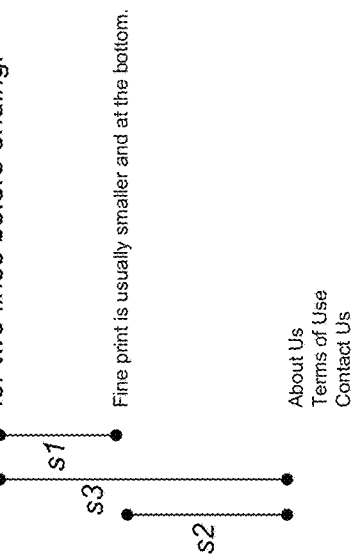

Additionally, or alternatively, the reliability modeler may estimate white space between one portion of the detected text and another portion of the detected text (e.g., between headings, as represented by s2 in FIG. 2B; between a header and a paragraph, as represented by s3 in FIG. 2B; between paragraphs, as represented by s4 in FIG. 2B; between a paragraph and fine print, as represented by s1 in FIG. 2C; or between a paragraph and a footer, as represented by s3 in FIG. 2C, among other examples).

Additionally, or alternatively, the reliability modeler may transcribe the detected text (e.g., using OCR). Accordingly, the reliability modeler may determine unique words (optionally with a frequency thereof) in the text. Additionally, or alternatively, the reliability modeler may apply sentiment analysis to the text to determine a tone associated with the text. For example, the reliability modeler may apply natural language processing (NLP) to determine a score associated with the text (e.g., a score reflecting positivity of the tone or another measure of the tone) and/or a tonal category (e.g., one or more categories) associated with the text (e.g., happy, sad, objective, subjective, informational, or persuasive, among other examples).

Additionally, or alternatively, the reliability modeler may detect a uniform resource locator (URL) in (or at least associated with) the webpages. For example, the transcribed text may include a string that matches a pattern associated with URLs (e.g., beginning with "http:" or "www." or including ".com" and forward slashes or terminating in ".htm" or ".html" among other examples). Additionally, or alternatively, the reliability modeler may receive, from the Internet scraper, an indication of URLs (e.g., one or more URLs) associated with the webpages (e.g., included in a message with the webpages).

As shown in FIG. 1C and by reference number 140, the reliability modeler may apply a model, trained on the style guide associated with the first entity, to determine a reliability associated with the webpages. For example, the model may be trained as described in connection with FIG. 3A and applied as described in connection with FIG. 3B. The reliability modeler may determine that the webpages purport to be associated with the first entity, as described above, and select the model to apply using a data structure that links entity names to indications of possible models to apply.

The reliability modeler may apply the model to the logo, the color, the font, and/or any additional factors (e.g., the spacings, white space measurements, and/or text analysis described above) that are determined from the webpages. Accordingly, the model may determine a reliability score for the webpages based on a similarity between the logo, the color, the font, and/or the additional factors and what is expected based on the style guide associated with the first entity.

In some implementations, the model may be additionally or alternatively trained to recognize programming style associated with the first entity, as described above. For example, the model may be trained on the example copy authored by the first entity. Accordingly, the model may determine a reliability score for the webpages based on a similarity between a detected programming style in the code associated with the webpages and previously published code from the first entity. Additionally, or alternatively, the model may accept supplemental information (e.g., from a remote server and associated with the first entity) as input. For example, the supplemental information may include a list (or an array or another similar data structure) indicating products (e.g., by listing product names and/or descriptions) authorized by the first entity. In another example, the supplemental information may include a list (or an array or another similar data structure) indicating URLs used by the first entity. Accordingly, the reliability score may be further based on whether a URL (e.g., detected in the webpages) is included in a list of URLs used by the first entity and/or whether a product name or description (e.g., included in the webpages) is included in a list of names or descriptions authorized by the first entity.

In addition to the reliability score, the model may further output an entity most likely to be associated with the webpages. For example, when the reliability score satisfies a reliability threshold, the entity most likely to be associated with the product, the store, the email, or the webpage may be the first entity. On the other hand, when the reliability score fails to satisfy the reliability threshold, the entity most likely to be associated with the product, the store, the email, or the webpage may be a different entity (e.g., an infringing company or a known scam or fraud, among other examples).

As shown by reference number 145a, the reliability modeler may transmit, and the user device may receive, an indication of the reliability score. For example, the user device may display the reliability score and/or may display a visual indicator of whether the reliability score satisfies the reliability threshold (e.g., whether the webpages are likely or unlikely to be authorized by the first entity). In some implementations, the user device may further display a name of the entity most likely to be associated with the webpages.

Additionally, or alternatively, the reliability modeler may transmit, and the user device may receive, an indication of the webpages when the reliability score fails to satisfy the reliability threshold. For example, the reliability modeler may transmit a report indicating websites (e.g., one or more websites, comprised of the webpages) that are suspected infringers (or scams or frauds). Accordingly, the user of the user device may perform remediation based on the report. For example, the user may, via the user device, submit digital millennium copyright act (DMCA) notices to search engines and/or Internet hosts based on the indicated websites. In another example, the user may, via the user device, submit cease-and-desist letters to owners (and/or operators) of the indicated websites. In some implementations, the user device may trigger the remediation automatically in response to the report (or in response to input from the user approving the report). As a result, power and processing resources that would otherwise have been consumed in performing remediation are conserved because the user device may use templates in combination with the report to perform the remediation faster and with less input from the user.

Additionally, or alternatively, as shown by reference number 145b, the reliability modeler may transmit, for storing in the reliability database, an indication of the reliability score. For example, the reliability database may store the indication of the reliability score in associated with the indication of the webpages. Accordingly, the user device may access the reliability database to determine which webpages are associated with reliability scores that fail to satisfy the reliability threshold (e.g., which webpages are unlikely to be authorized by the first entity). In some implementations, the reliability database may further store a name of the entity most likely to be associated with the webpages. Accordingly, the user of the user device may perform remediation (e.g., as described above) based on reliability scores in the reliability database.

In some implementations, the reliability modeler may update the model based on feedback from the user device. For example, the feedback may include a rating (e.g., a numerical store, a letter grade, or a selected category from a plurality of possible categories, among other examples) associated with quality of the indication (e.g., transmitted to the user device). Accordingly, the model may be updated using a retraining procedure. For example, the reliability modeler may, at least partially, retrain the model as described in connection with FIG. 3A.

By using techniques as described in connection with FIGS. 1A-1C, the reliability modeler uses the set of guidelines associated with the first entity to train the model, which conserves power and processing resources as compared with training the model on a large training set of labeled examples. Additionally, or alternatively, the reliability modeler uses a programming style associated with the first entity to train the model, which conserves power and processing resources as compared with training the model on a large training set of labeled examples. Training the model on the set of guidelines and/or the programming style also reduces chances that the model will inadvertently identify irrelevant features as indicative of unreliability. Accordingly, the reliability model conserves power and processing resources each time the model is executed.

As indicated above, FIGS. 1A-1C are provided as an example. Other examples may differ from what is described with regard to FIGS. 1A-1C.

FIGS. 2A, 2B, and 2C are diagrams of examples 200, 210, and 220, respectively associated with detecting reliability across the Internet after scraping. As shown in FIGS. 2A-2C, examples 200, 210, and 220 may include calculations made by a reliability modeler, which is described in more detail in connection with FIGS. 4 and 5.

As shown in FIG. 2A, a logo may be detected within a webpage (e.g., by the reliability modeler). The logo may be associated with a size that includes a height (e.g., represented by h1) and a width (e.g., represented by w1). The size may be calculated in real dimensions (e.g., as estimated by a rendering of the webpage) and/or in pixels (e.g., based on code associated with the webpage). Additionally, the logo may be associated with a spacing between the logo and nearby text (e.g., represented by s1) and/or a spacing between the logo and a nearby menu (e.g., represented by s2). The spacings may be calculated in real dimensions (e.g., as estimated by a rendering of the webpage) and/or in pixels (e.g., based on code associated with the webpage).

As further shown in FIG. 2A, the menu may include multiple elements, and each element may be associated with a size that includes a height (e.g., represented by h2) and a width (e.g., represented by w2). The size may be calculated in real dimensions (e.g., as estimated by a rendering of the webpage) and/or in pixels (e.g., based on code associated with the webpage). Although shown as having the same size, at least two menu elements may be associated with different sizes. Additionally, the menu elements may be associated with a spacing between the elements (e.g., represented by s3). The spacing may be calculated in real dimensions (e.g., as estimated by a rendering of the webpage) and/or in pixels (e.g., based on code associated with the webpage).

As shown in FIG. 2B, a logo may be detected within a webpage (e.g., by the reliability modeler). The logo may be associated with a spacing (or a white space) between the logo and a boarder (e.g., represented by s1). The spacing may be calculated in real dimensions (e.g., as estimated by a rendering of the webpage) and/or in pixels (e.g., based on code associated with the webpage). Although shown as between the logo and the border, other examples may include a spacing between the logo and a color (or a color gradient).

As further shown in FIG. 2B, text may be detected within a webpage (e.g., by the reliability modeler). The text may be associated with multiple styles, such as headings and paragraphs as shown in example 210. The styles may be estimated based on a rendering of the webpage or determined based on code associated with the webpage. The text may be associated with a spacing between headings (e.g., represented by s2), a spacing between a heading and a corresponding paragraph (e.g., represented by s3), and/or a spacing between paragraphs (e.g., represented by s4). The spacing(s) may be calculated in real dimensions (e.g., as estimated by a rendering of the webpage) and/or in pixels (e.g., based on code associated with the webpage).

As further shown in FIG. 2C, text may be detected within a webpage (e.g., by the reliability modeler). The text may be associated with multiple styles, such as headings, paragraphs, fine print, and a footer, as shown in example 220. The styles may be estimated based on a rendering of the webpage or determined based on code associated with the webpage. The text may be associated with a spacing between a paragraph and fine print (e.g., represented by s1), a spacing between fine print and a footer (e.g., represented by s2), and/or a spacing between a paragraph and a footer (e.g., represented by s3). The spacing(s) may be calculated in real dimensions (e.g., as estimated by a rendering of the webpage) and/or in pixels (e.g., based on code associated with the webpage).

Any of the measurements described in connection with FIGS. 2A-2C may be input to a model for determining reliability (e.g., by the reliability modeler), as described in connection with FIG. 1C and FIGS. 3A-3B. As indicated above, FIGS. 2A-2C are provided as examples. Other examples may differ from what is described with regard to FIGS. 2A-2C.

FIGS. 3A-3B are diagrams illustrating an example 300 of training and using a machine learning model in connection with detecting reliability across the Internet after scraping. The machine learning model training described herein may be performed using a machine learning system. The machine learning system may include or may be included in a computing device, a server, a cloud computing environment, or the like, such as an Internet scraper described in more detail below.

As shown by reference number 305, a machine learning model may be trained using a set of observations. The set of observations may be obtained and/or input from training data (e.g., historical data), such as data gathered during one or more processes described herein. For example, the set of observations may include data gathered from a user device, as described elsewhere herein. In some implementations, the machine learning system may receive the set of observations (e.g., as input) from the user device and/or a reliability modeler.

As shown by reference number 310, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the user device. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a color (e.g., an RGB value associated with the color), a second feature of a font, a third feature of a logo spacing (e.g., represented by s1), and so on. As shown, for a first observation, the first feature may have a value of (153,0,0), the second feature may have a value of Calibri, the third feature may have a value of 10 pixels, and so on. These features and feature values are provided as examples, and may differ in other examples. For example, the feature set may include one or more of the following features: a tone associated with text, unique words included in text, a word frequency associated with text, a white space measurement associated with text, a size associated with the logo, a placement associated with the logo, a size associated with text, or a URL, among other examples. In some implementations, the machine learning system may preprocess and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 315, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 300, the target variable is a reliability score, which has a value of 100 for the first observation. The set of observations may all be associated with reliability scores of 100 when the set of observations are based on a set of guidelines (e.g., style guidelines). The set of observations may be associated with reliability scores of less than 100 when the set of observations are based on previously published copy.

The feature set described above is provided as an example, and other examples may differ from what is described above. For example, the feature set may include spaces associated with HTML, code, CSSs, JavaScript, or another type of code; an indentation style associated with HTML code, CSSs, JavaScript, or another type of code; tabs associated with HTML code, CSSs, JavaScript, or another type of code; or an alignment style associated with HTML code, CSSs, JavaScript, or another type of code, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that may include a first subset of observations, of the set of observations, and a test set 325 that may include a second subset of observations of the set of observations. The training set 320 may be used to train (e.g., fit or tune) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm may include a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used and/or based on randomly generating hyperparameter values). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups and/or based on randomly selecting a number of groups) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k-1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, or closest to a desired threshold) overall cross-validation score for training the machine learning model. The machine learning system may then train the machine learning model using the selected hyperparameter set 340, without cross-validation (e.g., using all of data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 345 to be used to analyze new observations, as described below in connection with FIG. 4.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 345.

FIG. 3B is a diagram illustrating applying the trained machine learning model 345 to a new observation. As shown by reference number 350, the machine learning system may receive a new observation (or a set of new observations), and may input the new observation to the machine learning model 345. As shown, the new observation may include a first feature of (150,4,3), a second feature of Calibri, a third feature of 8 pixels, and so on, as an example. The machine learning system may apply the trained machine learning model 345 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 345 may predict a value of 50 for the target variable of a reliability score for the new observation, as shown by reference number 355. Based on this prediction (e.g., based on the value having a particular label or classification or based on the value satisfying or failing to satisfy a threshold), the machine learning system may provide a recommendation and/or output for determination of a recommendation, such as an indication of unreliability. Additionally, or alternatively, the machine learning system may perform an automated action and/or may cause an automated action to be performed (e.g., by instructing another device to perform the automated action), such as displaying a visual alert (and/or playing an audible alert) that the new observation is unreliable. As another example, if the machine learning system were to predict a value of 98 for the target variable of a reliability score, then the machine learning system may provide a different recommendation (e.g., an indication of reliability) and/or may perform or cause performance of a different automated action (e.g., displaying a visual alert, and/or playing an audible alert, that the new observation is reliable). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 345 may classify (e.g., cluster) the new observation in a cluster, as shown by reference number 360. The observations within a cluster may have a threshold degree of similarity. As an example, if the machine learning system classifies the new observation in a first cluster (e.g., a cluster of unreliability), then the machine learning system may provide a first recommendation, such as an indication of unreliability. Additionally, or alternatively, the machine learning system may perform a first automated action and/or may cause a first automated action to be performed (e.g., by instructing another device to perform the automated action) based on classifying the new observation in the first cluster, such as displaying a visual alert (and/or playing an audible alert) that the new observation is unreliable. As another example, if the machine learning system were to classify the new observation in a second cluster (e.g., a cluster of reliability), then the machine learning system may provide a second (e.g., different) recommendation (e.g., an indication of reliability) and/or may perform or cause performance of a second (e.g., different) automated action, such as displaying a visual alert (and/or playing an audible alert) that the new observation is reliable.

In this way, the machine learning system may apply a rigorous and automated process to estimating reliability (e.g., of a website). The machine learning system may enable recognition and/or identification of tens, hundreds, thousands, or millions of features and/or feature values for tens, hundreds, thousands, or millions of observations. Additionally, the machine learning system may train the model 345 using a set of guidelines associated with an entity, thereby increasing accuracy and consistency and reducing delay associated with training relative to requiring computing resources to be allocated for training using labeled examples. The increased accuracy and consistency also results in reduced computing resources that are consumed each time the machine learning system applies the model 345.

As indicated above, FIGS. 3A-3B are provided as an example. Other examples may differ from what is described in connection with FIGS. 3A-3B. For example, the machine learning model may be trained using a different process than what is described in connection with FIG. 3A. Additionally, or alternatively, the machine learning model may employ a different machine learning algorithm than what is described in connection with FIGS. 3A-3B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 4:
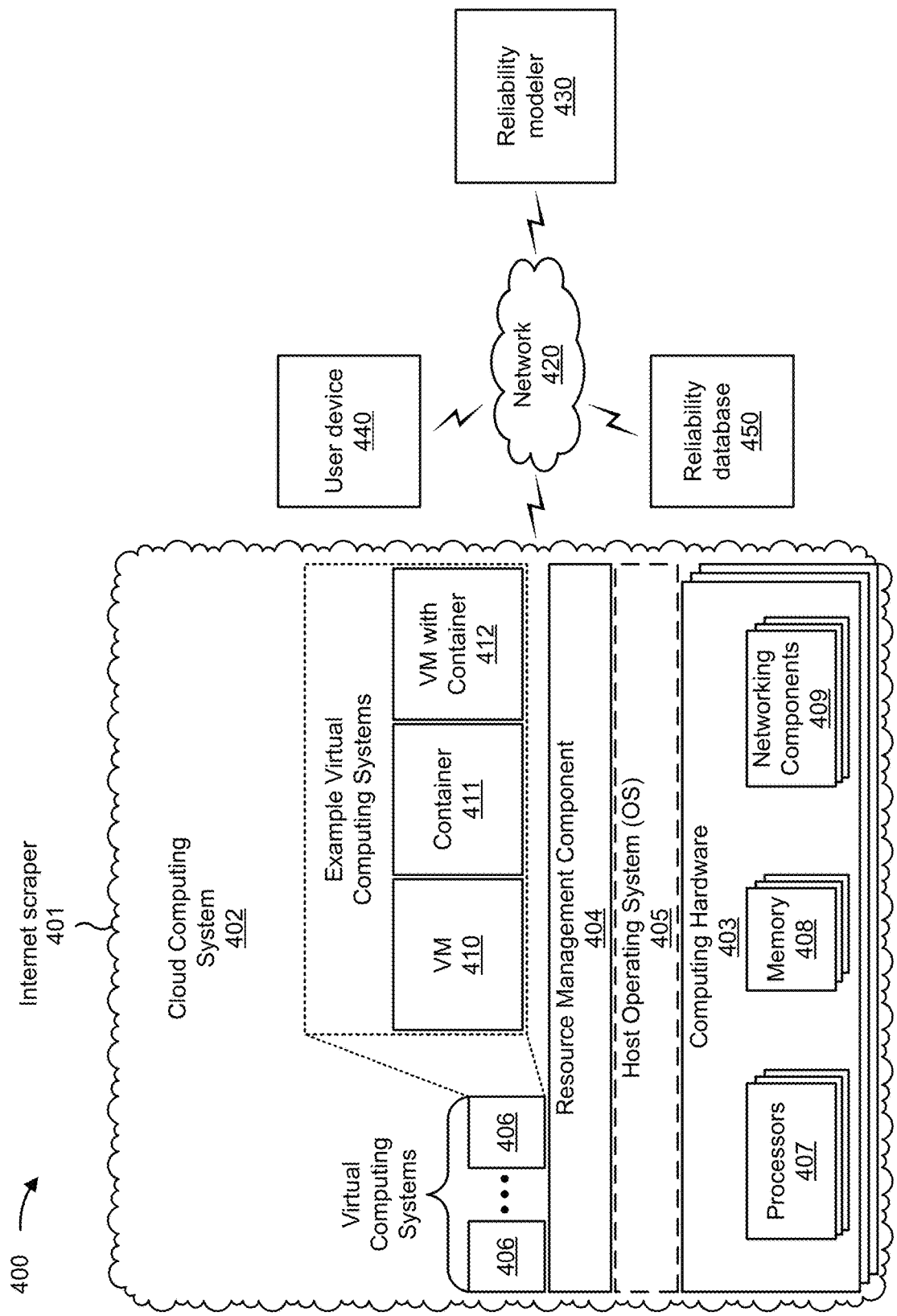
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include an Internet scraper 401, which may include one or more elements of and/or may execute within a cloud computing system 402. The cloud computing system 402 may include one or more elements 403-412, as described in more detail below. As further shown in FIG. 4, environment 400 may include a network 420, a reliability modeler 430, a user device 440, and/or a device implementing a reliability database 450. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the Internet scraper 401 may include one or more elements 403-412 of the cloud computing system 402, may execute within the cloud computing system 402, and/or may be hosted within the cloud computing system 402, in some implementations, the Internet scraper 401 may not be cloud-based (e.g., may be implemented outside of a cloud computing system) or may be partially cloud-based. For example, the Internet scraper 401 may include one or more devices that are not part of the cloud computing system 402, such as device 500 of FIG. 5, which may include a stand-alone server or another type of computing device. The Internet scraper 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The reliability modeler 430 may include one or more devices capable of receiving, generating, storing, processing, providing, and/or routing information associated with a reliability model, as described elsewhere herein. The reliability modeler 430 may include a communication device and/or a computing device. For example, the reliability modeler 430 may include a server, such as an application server, a client server, a web server, a database server, a host server, a proxy server, a virtual server (e.g., executing on computing hardware), or a server in a cloud computing system. In some implementations, the reliability modeler 430 may include computing hardware used in a cloud computing environment.

The user device 440 may include one or more devices capable of receiving, generating, storing, processing, and/or providing information associated with guidelines and/or previously published copy, as described elsewhere herein. The user device 440 may include a communication device and/or a computing device. For example, the user device 440 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The reliability database 450 may be implemented on one or more devices capable of receiving, generating, storing, processing, and/or providing information associated with reliability scores, as described elsewhere herein. The reliability database 450 may implemented on a communication device and/or a computing device. For example, the reliability database 450 may implemented on a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
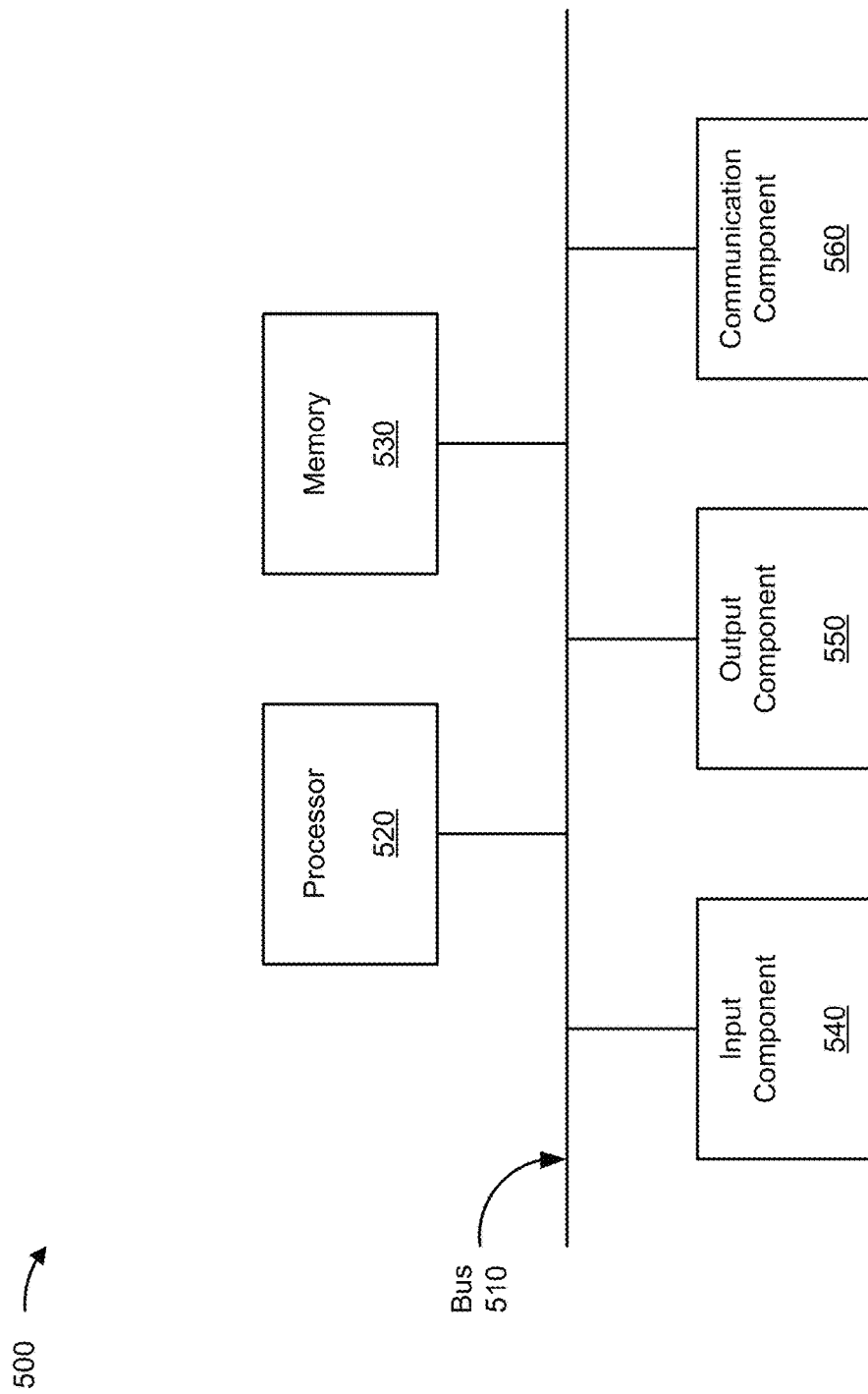
FIG. 5 is a diagram of example components of one or more devices of FIG. 4, in accordance with some embodiments of the present disclosure.

FIG. 5 is a diagram of example components of a device 500 associated with detecting reliability across the Internet after scraping. The device 500 may correspond to a reliability modeler, a user device, and/or a device implementing a reliability database. In some implementations, the reliability modeler, the user device, and/or the device implementing the reliability database may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
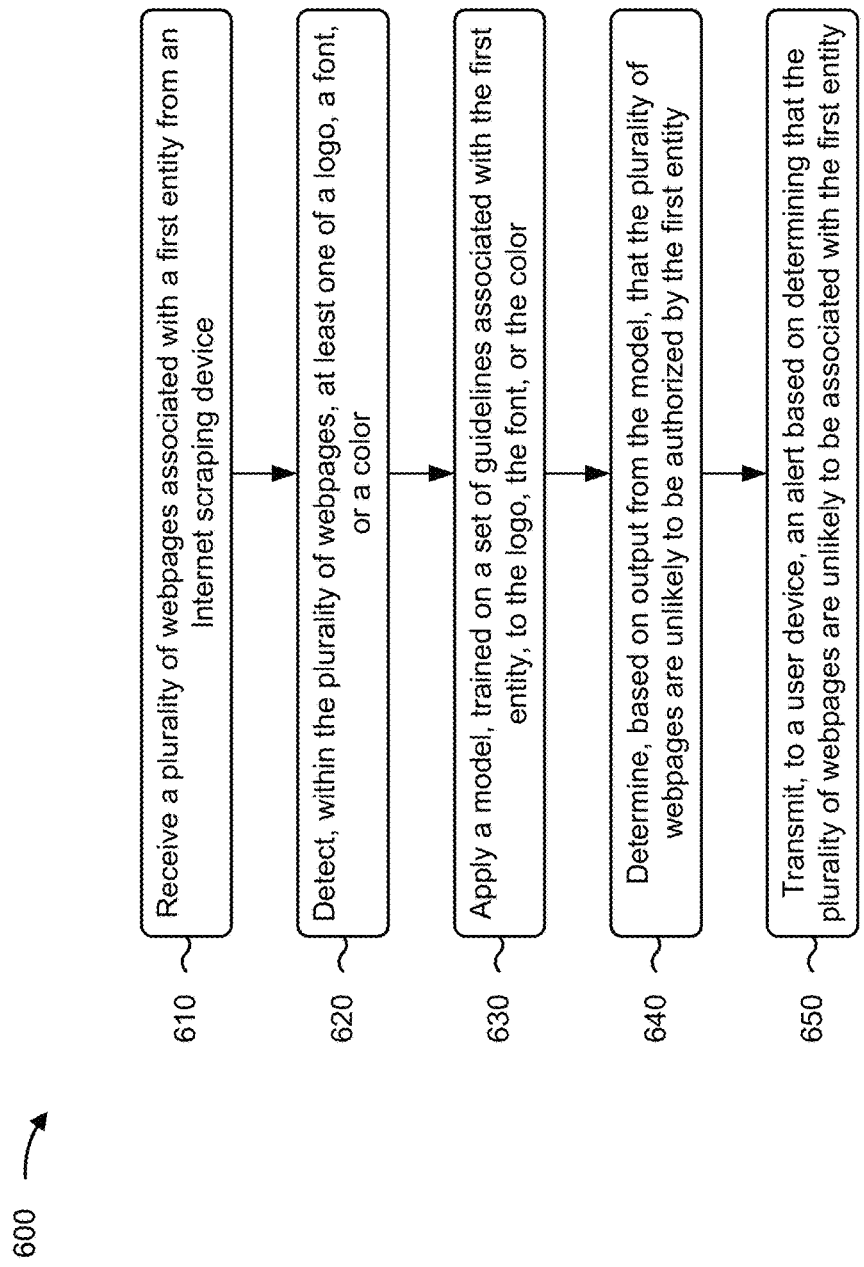
FIG. 6 is a flowchart of an example process relating to detecting reliability across the Internet after scraping, in accordance with some embodiments of the present disclosure.

FIG. 6 is a flowchart of an example process 600 associated with detecting reliability across the Internet after scraping. In some implementations, one or more process blocks of FIG. 6 may be performed by the reliability modeler 430. In some implementations, one or more process blocks of FIG. 6 may be performed by another device or a group of devices separate from or including the reliability modeler 430, such as the Internet scraper 401, the user device 440, and/or the device implementing the reliability database 450. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving a plurality of webpages associated with a first entity from an Internet scraping device (block 610). For example, the reliability modeler 430 (e.g., using processor 520, memory 530, input component 540, and/or communication component 560) may receive a plurality of webpages associated with a first entity from an Internet scraping device, as described above in connection with reference number 130 of FIG. 1B. As an example, the reliability modeler may transmit a request for the webpages, and the Internet scraper may transmit the webpages in response to the request. Alternatively, the reliability modeler may subscribe to receive webpages from the Internet scraper, whether on-demand or according to a schedule.

As further shown in FIG. 6, process 600 may include detecting, within the plurality of webpages, at least one of a logo, a font, or a color (block 620). For example, the reliability modeler 430 (e.g., using processor 520 and/or memory 530) may detect, within the plurality of webpages, at least one of a logo, a font, or a color, as described above in connection with reference number 135 of FIG. 1B. As an example, for the logo, the reliability modeler may render the webpages and then apply a Viola-Jones object detection framework based on Haar features, a SIFT model, an SSD, or a YOLO model, among other examples, to the rendered webpages to detect the logo. Alternatively, the reliability modeler may extract the logo from code associated with the webpages (e.g., HTML, code and/or CSS, among other examples). For the font, the reliability modeler may estimate the font based on detecting shapes of one or more letters printed on the webpage. Alternatively, the reliability modeler may determine the font from code associated with the webpages (e.g., HTML code and/or CSS, among other examples). For the color, the reliability modeler may determine a RGB color value and/or a hexadecimal code associated with the color. In some implementations, the reliability modeler may determine the color based on code associated with the webpages (e.g., HTML code and/or CSS, among other examples).

As further shown in FIG. 6, process 600 may include applying a model, trained on a set of guidelines associated with the first entity, to the logo, the font, or the color (block 630). For example, the reliability modeler 430 (e.g., using processor 520 and/or memory 530) may apply a model, trained on a set of guidelines associated with the first entity, to the logo, the font, or the color, as described above in connection with reference number 140 of FIG. 1C. As an example, the reliability modeler may apply the model to the logo, the color, the font, and/or any additional factors (e.g., spacings, white space measurements, and/or text analysis described herein) that are determined from the webpages. Accordingly, the model may determine a reliability score for the webpages based on a similarity between the logo, the color, the font, and/or the additional factors and what is expected based on the set of guidelines (and/or a programming style) associated with the first entity.

As further shown in FIG. 6, process 600 may include determining, based on output from the model, that the plurality of webpages are unlikely to be authorized by the first entity (block 640). For example, the reliability modeler 430 (e.g., using processor 520 and/or memory 530) may determine, based on output from the model, that the plurality of webpages are unlikely to be authorized by the first entity, as described above in connection with reference number 140 of FIG. 1C. As an example, the reliability model may determine that the webpages are unlikely to be authorized by the first entity when the reliability score fails to satisfy a reliability threshold.

As further shown in FIG. 6, process 600 may include transmitting, to a user device, an alert based on determining that the plurality of webpages are unlikely to be associated with the first entity (block 650). For example, the reliability modeler 430 (e.g., using processor 520, memory 530, and/or communication component 560) may transmit, to a user device, an alert based on determining that the plurality of webpages are unlikely to be associated with the first entity, as described above in connection with reference number 145a of FIG. 1C. As an example, the alert may include the reliability score and/or an indication of whether the reliability score satisfies the reliability threshold (e.g., whether the webpages are likely or unlikely to be authorized by the first entity). In some implementations, the alert may further include a name of the entity most likely to be associated with the webpages. In some implementations, the alert may include a report indicating websites (e.g., one or more websites, comprised of the webpages) that are suspected infringers (or scams or frauds). Accordingly, the user of the user device may perform remediation, as described herein, based on the report.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1C, 2A-2C, and/or 3A-3B. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for detecting reliability after web scraping, the system comprising:
one or more memories; and
one or more processors, communicatively coupled to the one or more memories, configured to:
receive, based on using an Internet scraping device, a plurality of webpages of webpages available on the Internet and associated with a first entity,
wherein the Internet scraping device is a hardware device that is configured to extract information from the webpages, and
wherein using the Internet scraping device comprises:
executing a virtual web browser;
transforming a command associated with the Internet scraping device into another command that mimics human interactions with the webpages;
gathering data related to the webpages based on the other command; and
discarding a set of webpages of the webpages that are not associated with the first entity;
detect, within the plurality of webpages, at least one of a logo, a font, or a color;
detect, within the plurality of webpages, a plurality of words;
apply a model, trained on a set of guidelines associated with the first entity, to the logo, the font, or the color,
wherein the model is applied to one or more words of the plurality of words, and
wherein the color is associated with the plurality of words;
determine, based on output from the model, that the plurality of webpages are unlikely to be authorized by the first entity;
transmit, to a user device, an indication of the plurality of webpages; and
update the model based on feedback from the user device.

2. The system of claim 1, wherein the plurality of webpages are each associated with a same domain name.

3. The system of claim 1, wherein the one or more processors are further configured to:
determine a size associated with the logo,
wherein the model is applied to the size.

4. The system of claim 1, wherein the one or more processors are further configured to:
determine at least one spacing associated with the logo,
wherein the model is applied to the at least one spacing.

5. The system of claim 1, wherein the feedback comprises a rating associated with quality of the indication, and the model is updated using a retraining procedure.

6. The system of claim 1, wherein the one or more processors are further configured to:
detect, within the plurality of webpages, a white space measurement associated with the logo and a color gradient,
wherein the model is applied to the white space measurement.

7. A method of detecting reliability after web scraping, comprising:
receiving, by using an Internet scraping device, a plurality of webpages of webpages available on the Internet and associated with a first entity, from an Internet scraping device
wherein the Internet scraping device is a hardware device that is configured to extract information from the webpages, and
wherein using the Internet scraping device comprises:
executing a virtual web browser;
transforming a command associated with the Internet scraping device into another command that mimics human interactions with the webpages;
gathering data related to the webpages based on the other command; and
discarding a set of webpages of the webpages that are not associated with the first entity;
detecting, within the plurality of webpages, at least one of a logo, a font, or a color;
detecting, within the plurality of webpages, a plurality of words;
applying a model, trained on a set of guidelines associated with the first entity, to the logo, the font, or the color,
wherein the model is applied to one or more words of the plurality of words, and
wherein the color is associated with the plurality of words;
determining, based on output from the model, that the plurality of webpages are unlikely to be authorized by the first entity; and
transmitting, to a user device, an alert based on determining that the plurality of webpages are unlikely to be associated with the first entity.

8. The method of claim 7, further comprising:
applying sentiment analysis to the plurality of words to determine a tone,
wherein the model is applied to the tone.

9. The method of claim 7, further comprising:
detecting, within the plurality of webpages, at least one spacing associated with the logo and the plurality of words,
wherein the model is applied to the spacing.

10. The method of claim 7, further comprising:
detecting, within the plurality of webpages, one or more white space measurements associated with the plurality of words,
wherein the model is applied to the one or more white space measurements.

11. The method of claim 7, wherein the color is associated with the logo.

12. The method of claim 7, further comprising:
detecting, within the plurality of webpages, a white space measurement associated with the logo and a color gradient,
wherein the model is applied to the white space measurement.

13. The method of claim 7, further comprising:
detect, within the plurality of webpages, a white space measurement associated with a first heading and a second heading,
wherein the model is applied to the white space measurement.

14. A non-transitory computer-readable medium storing a set of instructions for detecting reliability after web scraping, the set of instructions comprising:
one or more instructions that, when executed by one or more processors of a device, cause the device to:
receive, based on using an Internet scraping device, a plurality of webpages of webpages available on the Internet and associated with a first entity, wherein the Internet scraping device is a hardware device that is configured to extract information from the webpages, and wherein using the Internet scraping device comprises:
  executing a virtual web browser;
  transforming a command associated with the Internet scraping device into another command that mimics human interactions with the webpages;
  gathering data related to the webpages based on the other command; and
  discarding a set of webpages of the webpages that are not associated with the first entity;

detect, within the plurality of webpages, at least one of a logo, a font, or a color;

detect, within the plurality of webpages, a plurality of words;

apply a model, trained on a set of guidelines associated with the first entity, to the logo, the font, the first-color, and the second color;
  wherein the model is applied to one or more words of the plurality of words, and
  wherein the color is associated with the plurality of words;

determine, based on output from the model, that the plurality of webpages are unlikely to be authorized by the first entity;

transmit, to a user device, an indication of the plurality of webpages; and update the model based on feedback from the user device.

15. The non-transitory computer-readable medium of claim 14, wherein the one or more instructions, when executed by the one or more processors, further cause the device to:
  detect, within the plurality of webpages, at least one spacing associated with the logo and a border,
  wherein the model is applied to the at least one spacing.

16. The non-transitory computer-readable medium of claim 14, wherein the one or more instructions, when executed by the one or more processors, further cause the device to:
  detect, within the plurality of webpages, a white space measurement associated with the logo and a color gradient,
  wherein the model is applied to the white space measurement.

17. The non-transitory computer-readable medium of claim 14, wherein the one or more instructions, when executed by the one or more processors, further cause the device to:
  detect, within the plurality of webpages, a white space measurement associated with a first heading and a second heading,
  wherein the model is applied to the white space measurement.

18. The non-transitory computer-readable medium of claim 14, wherein the one or more instructions, when executed by the one or more processors, further cause the device to:
  detect, within the plurality of webpages, a white space measurement associated with a first paragraph and a second paragraph,
  wherein the model is applied to the white space measurement.

19. The non-transitory computer-readable medium of claim 14, wherein the one or more instructions, when executed by the one or more processors, further cause the device to:
  detect, within the plurality of webpages, a white space measurement associated with a heading and a corresponding paragraph,
  wherein the model is applied to the white space measurement.

20. The non-transitory computer-readable medium of claim 14, wherein the one or more instructions, when executed by the one or more processors, further cause the device to:
  detect, within the plurality of webpages, a white space measurement associated with a paragraph and a footer,
  wherein the model is applied to the white space measurement.

* * * * *